United States Patent [19]

Medemblik

[11] Patent Number: 4,599,016
[45] Date of Patent: Jul. 8, 1986

[54] CYCLONE APPARATUS FOR PNEUMATICALLY MOVING GRANULAR MATTER

[75] Inventor: J. John Medemblik, Guelph, Canada

[73] Assignee: Walinga Body & Coach Limited, Guelph, Canada

[21] Appl. No.: 754,230

[22] Filed: Jul. 12, 1985

[51] Int. Cl.[4] ................. B65G 53/40; B65G 53/60
[52] U.S. Cl. ........................... 406/67; 406/173; 406/109; 55/318; 55/345
[58] Field of Search ............... 406/109, 108, 171, 172, 406/168, 65, 173, 169; 55/337, 318, 457, 467, 345, 359 R, 459 R, 459, 406, 456

[56] References Cited

U.S. PATENT DOCUMENTS

| | | | |
|---|---|---|---|
| 2,489,618 | 11/1949 | Cantin | 55/456 |
| 2,535,140 | 12/1950 | Kassel | 55/459 R |
| 2,917,344 | 12/1959 | Futty | 406/109 |
| 2,946,626 | 7/1960 | Atkinson et al. | 406/109 |
| 3,423,130 | 1/1969 | Milner | 406/168 |
| 3,425,192 | 2/1969 | Davis | 55/459 R |
| 3,611,679 | 10/1971 | Pall | 55/457 |
| 4,200,415 | 4/1980 | Boring | 406/173 |

*Primary Examiner*—Jeffrey V. Nase
*Assistant Examiner*—L. E. Williams
*Attorney, Agent, or Firm*—Ridout & Maybee

[57] ABSTRACT

A pneumatic device for moving granular matter is described which comprises a first cyclonic separator for receiving granular matter conveyed by an air stream from a first location and a secondary cyclonic air cleaner for removing dust and abrasive particles from the air stream prior to passage thereof into the intake of the blower. The granular matter received by the first cyclonic separator passes through a rotary valve to a duct where it is conveyed to a second location by a high pressure air stream from the outlet of the blower.

9 Claims, 3 Drawing Figures

CYCLONE APPARATUS FOR PNEUMATICALLY MOVING GRANULAR MATTER

This invention relates to pneumatic conveyance devices, and in particular such devices used to transfer agricultural grains, beans, corn and the like.

Pneumatic conveyance devices for agricultural applications have been known for some time. These devices commonly employ a fan or blower to create a vacuum for sucking the grain or other granular matter into a cyclonic receptacle from one location and transferring the grain through an outlet of the receptacle to a second location by means of compressed air provided by the same blower. Because these pneumatic conveyance devices rely on a moving air stream to effect the transfer of granular material, any smaller particles associated with the granular material become airborne. These smaller particles are light as compared to the grains of material being transferred and they tend to follow the air flow through the cyclonic receptacle to the intake of the blower. Often these smaller particles are abrasive and, therefore, cause premature wear to the air moving blower components. In agricultural applications, this excessive wear problem is especially serious when dealing with granular matter such as white beans or soybeans which are often grown in a sandy soil and, hence, have a considerable amount of particulate sand associated therewith.

Because of the large volumes of air used by these pneumatic devices, it is not practical to use a filter to remove unwanted airborne particles from the air entering the blower. A filter would rapidly become clogged. A cyclone has been used to separate particulate matter from the air stream leaving a collecting receptacle of a device of this type. The particles are forced to the walls of the cyclone and fall through a hole in the bottom thereof for containment in a separate or the same receptacle as used for the principal granular material.

For example, U.S. Pat. No. 3,955,236 dated May 11, 1976, describes a vacuum collector system for gravel, wherein the gravel is sucked into a first compartment, the outlet of which is connected to a cyclone separator for removing dust from the air stream entering the air pump. Also, U.S. Pat. No. 4,218,226 dated Aug. 19, 1980, describes a vacuum apparatus for particulate matter having a similar arrangement of components including a cyclone for cleaning the air entering the fan.

It has been found that the use of a single cyclone to clean air being drawn into a fan of a pneumatic conveyance apparatus is often not effective to remove sufficient abrasive particulate matter to prevent premature wear to the fan. This is especially true in those devices employing an air pump which comprises a high pressure positive displacement blower having air moving components comprising precisely machined interengaging surfaces.

The present invention addresses this problem by providing a second cyclonic air cleaner for air being drawn into a blower used in a pneumatic conveyance device of the type described. This secondary cyclonic air cleaner is much smaller than the primary cyclone of the device, and the secondary cyclonic air cleaner may have any of several designs. The secondary cyclone preferably is provided with its own container for collecting particles removed from the air stream. The container may have a counterweighted hinged bottom plate for automatic release of the contents thereof.

Accordingly, the present invention provides a pneumatic conveyance apparatus for moving granular matter, comprising an enclosed container having a lower cyclone portion and an upper portion defined by an internal partition having an aperture therethrough allowing communication between the portions. The container has at least one inlet for sucking air and granular matter into the lower cyclone portion, and has an outlet for exhausting air from the upper portion. Valve and duct means are provided for conveying granular matter collected in the lower cyclone portion therefrom, and a blower is connected between the container outlet and the valve and duct means for creating a partial vacuum in the container and an elevated pressure at the valve and duct means. A secondary cleaner for air leaving the container and entering the blower is provided, comprising an intake for air within the upper portion of the container, cyclone forming means for allowing particles carried by said air taken in to be separated from the air stream, means for collecting and containing the separated particles, and an outlet for the cleaned air.

Particulars of a preferred embodiment of the pneumatic conveyance apparatus of the invention including two alternative structures for the secondary cleaner, follow with reference being made to the drawings in which.

Figure 1:
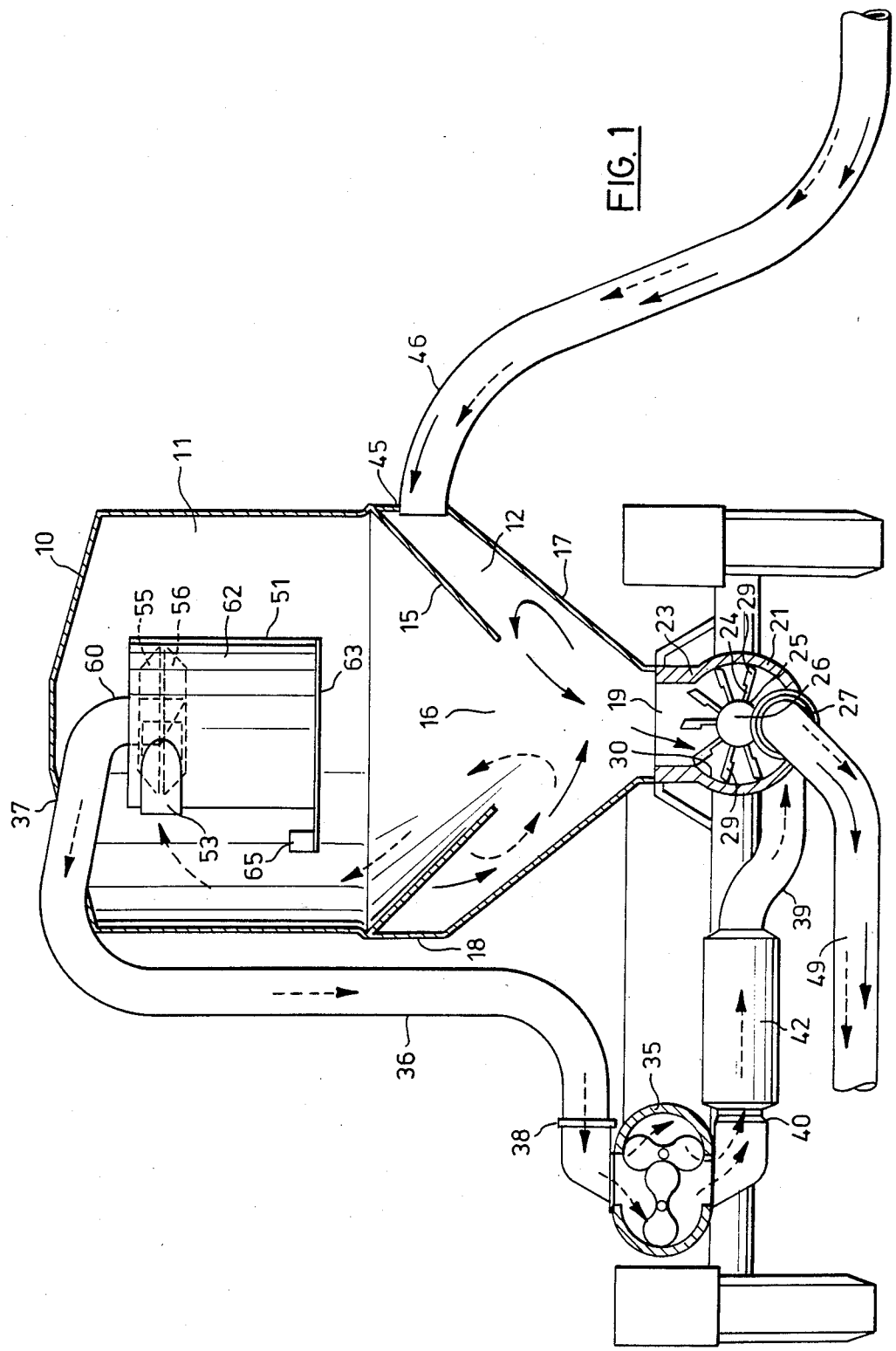
FIG. 1 is a cross sectional view of the container, blower and valve and duct means comprising the apparatus.

A pneumatic conveyance apparatus in accordance with the present invention is shown in FIG. 1. The apparatus comprises a container 10 having an upper portion 11 and a lower cyclone portion 12 defined by a partition 15 provided within the container 10. The lower portion 12 has a frustoconical shaped lower surface 17, a cylindrical side surface 18 and the downward extending frustoconical shaped partition 15 which combine to encourage the cyclonic movement of air within the portion 12. The partition 15 defines an aperture 16 which allows for communication between the upper and lower portions 11 and 12. The lower surface 17 defines an opening 19 for communication with a valve and duct means 21 used for moving granular matter collected in the lower portion 12 therefrom.

The valve and duct means 21 preferably comprises an airsealed rotary valve 23 having a plurality of vanes 24 extending radially from a hub 25 which rotates about an axis 26 for moving granular matter from the lower portion 12 to a duct 27. The vanes 24 are provided with flexible or adjustable tips 29 which sealingly engage the inner surface 30 of the valve 23 to provide an airseal between the duct 27 and the lower portion 12.

An air pump or blower 35 is connected between the upper portion 11 and the duct 27 for creating a partial vacuum in the container 10 and an elevated pressure at the duct 27. Preferably, the blower 35 comprises a positive displacement blower but a fan-type blower is also suitable. A conduit 36 connects an outlet 37 for the upper portion 11 of the container 10 to an inlet 38 of the blower 35. Likewise, a conduit 39 connects an outlet 40 of the blower 35 to one end of the duct 27. To reduce noise, a muffler 42 may be inserted in the conduit 39.

The container 10 is provided with an inlet 45 which is positioned tangentially to the cylindrical side of the lower cyclone portion 12. A conduit 46, such as a flexible hose, may be attached to the inlet 45 to provide means for sucking up granular matter for delivery to the inlet 45. Likewise the exit end of the duct 27 may be provided with a flexible conduit 49 for directing the deposition of granular material expelled from the lower portion 12 and duct 27.

Figure 2:
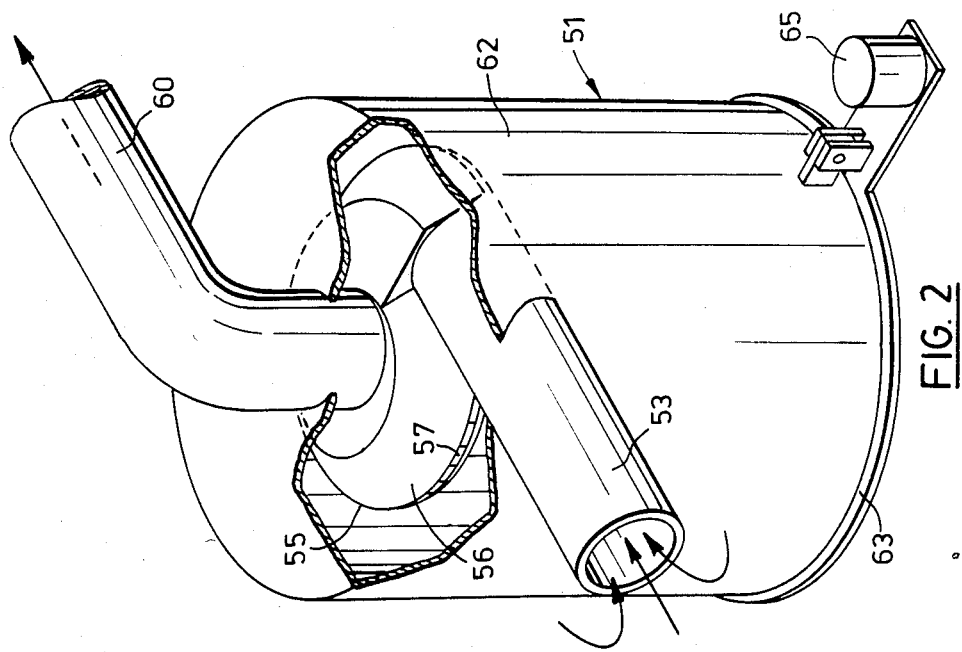
FIG. 2 is an enlarged perspective view, partially broken away, of the secondary cleaner shown in FIG. 1.

The upper portion 11 of the container 10 is also preferably equipped with a secondary cyclonic cleaner 51 for the air stream entering the blower 35. As shown in FIGS. 1 and 2, the secondary cleaner comprises an intake 53 leading tangentially into a cyclone forming means 55, which in one preferred embodiment comprises opposed frustoconical members 56 joined at their respective bases defining a continuous slot or plurality of ports 57 about the circumference of the means 55 at the area of the join. An outlet 60 is provided centrally from the cyclone forming means 55, and the cyclone means 55 is enclosed by a container 62 which collects and retains particles expelled through the slot or ports 57. The container 62 preferably has a hinged bottom plate 63 equipped with a counterweight 65 which allows the plate 63 to remain closed under the influence of the pressure difference caused by the blower 35, and to swing open when the blower 35 is turned off.

The preferred embodiment as just described is particularly useful for moving agricultural granular matter such as grains, beans or corn. In operation, the blower 35 is turned on and the conduit 46 is used to vacuum up the granular matter which is to be conveyed. The conduit 49 is used to deposit the granules vacuumed at the desired location.

The granular matter is carried by the air stream generated by the partial vacuum created in the container 10 by the blower 35 through the conduit 46 to the tangentially oriented inlet 45. The partition 15 and the bottom surface 17 cause the air stream and granular matter entering the lower cyclone portion 12 of the container 10 to move in a downward spiral which forces the granular matter outward toward the bottom surface 17, and to be deposited at the opening 19 to the rotary valve 23.

The cyclonic movement of the air stream and granular matter in the lower cyclone portion 12 serves as a primary cleaner for the air stream which moves through the aperture 16 and into the upper portion 11. Although the lower cyclone portion 12 operates to remove the granular matter and much of the finer particles associated with it, the air stream which rises through the aperture 16 and into the upper portion 11 carries with it dust and abrasive particles which are harmful to the air moving components of the blower 35.

The secondary cleaner 51 provides a second cyclonic separator such as the cyclone forming means 55 shown in FIGS. 1 and 2, wherein the air stream is directed in a swirling path which causes the particles carried by the air stream to be separated therefrom by centrifugal force caused by the differences in angular momentum between the particles and the air molecules. Thus, due to the cyclonic movement of air and particles within the secondary cleaner 51, the particles are forced outward through the slot or ports 67 and into the container 62.

Figure 3:
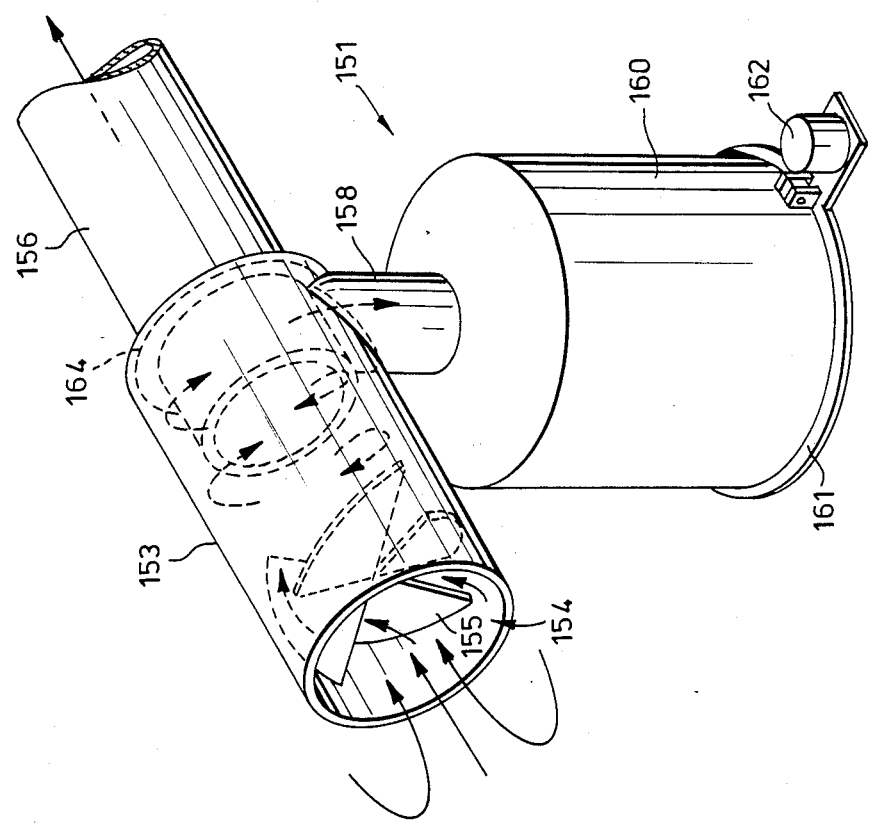
FIG. 3 is a perspective view of an alternative embodiment of a secondary cleaner for use in the apparatus of the invention.

An alternate preferred embodiment of a secondary cleaner 151 is shown in FIG. 3. This embodiment comprises an intake 153 having a fixed fan 154 having angled blades 155 positioned near the opening thereof. The opposite end of the intake 153 is provided with a conduit 156 connected through the outlet 37 of the container 10 to the conduit 36 and intake 38 of the blower 35. At the underside and at the rear of the intake 153 below the conduit 156, a pipe 158 is provided which leads to a dust and particle collection container 160 having a hinged bottom plate 161 with a counterweight 162 for operation in the manner described for the secondary cleaner 51.

In operation, the incoming air stream passes through the opening of the intake 153 of the secondary cleaner 151 and is caused to move in a spiral or cyclonic path by means of the blades 155 of the fan 154. The associated particles and dust are forced by centrifugal force to the inside wall of the intake 153 where they eventually proceed to the opening of the pipe 158 and into the container 160. The cleaned air passes into the smaller diameter conduit 156 mounted centrally through the rear wall 164 of the intake 153.

The foregoing description has been directed to preferred embodiments of a device intended primarily for conveying granular agricultural matter. However, the principles of the invention have broader application and may be adapted to similar devices intended for other uses such as conveying gravel or powders.

I claim:

1. A pneumatic conveyance apparatus for moving granular matter, comprising:
    an enclosed container having a lower cyclone portion and an upper portion defined by an internal partition having an aperture therethrough allowing communication between the portions, said container having at least one inlet for sucking air and granular matter into the lower cyclone portion, and having an outlet for exhausting air from the upper portion;
    valve and duct means for conveying granular matter collected in the lower cyclone portion therefrom;
    a blower connected between the container outlet and the valve and duct means for creating a partial vacuum in the container and an elevated pressure at the valve and duct means; and
    a secondary cleaner for air leaving the container and entering the blower, comprising an intake for particulate containing air within the upper portion of the container, the intake leading tangentially into a cyclone forming means, said means having opposed frustoconical members joined at their respective bases so as to define a slot or a plurality of ports about the circumference of the means at the area of the join, a container enclosing the cyclone means for collecting particles ejected from the cyclone, and an outlet for cleaned air leaving the cyclone means.

2. An apparatus as claimed in claim 1, wherein the internal partition is a downwardly extending frustoconical section.

3. An apparatus as claimed in claim 1, wherein the lower cyclone portion comprises a downwardly extending frustoconical lower surface, a cylindrical side surface, and the internal partition, said partition being frustoconically shaped and extending downwardly and inwardly from the side surface.

4. An apparatus as claimed in claim 1, wherein the inlet of the container is positioned to provide a tangential introduction of air and granular matter into the lower cyclone portion.

5. An apparatus as claimed in claim 1, wherein the upper portion comprises more than twice the volume of the lower cyclone portion of the container.

6. An apparatus as claimed in claim 1, wherein the valve and duct means comprises an airsealed rotary valve having a plurality of vanes extending radially from a hub, said vanes causing movement of granular matter collected in the lower cyclone portion to a duct opening into the bottom portion of the rotary valve.

7. An apparatus as claimed in claim 6, wherein the vanes are provided with flexible or adjustable tips which sealingly engage the inner surface of the valve to provide an airseal between the duct and the lower cyclone portion.

8. An apparatus as claimed in claim 1, wherein the blower is a positive displacement blower.

9. An apparatus as claimed in claim 1, wherein the secondary cleaner further comprises a hinged bottom plate for the container having a counterweight so that the plate remains closed under the influence of the suction produced by the blower, and swings open when the blower is turned off.

* * * * *